(12) United States Patent
Krishna et al.

(10) Patent No.: US 10,790,689 B2
(45) Date of Patent: Sep. 29, 2020

(54) INTELLIGENT CONTACT CHARGING DEVICES AND METHODS

(71) Applicant: FAIRCHILD SEMICONDUCTOR CORPORATION, Sunnyvale, CA (US)

(72) Inventors: Mukund Krishna, Belmont, CA (US); Karttikeya Shah, Fremont, CA (US); Alvin Fok, San Bruno, CA (US)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 385 days.

(21) Appl. No.: 15/805,966

(22) Filed: Nov. 7, 2017

(65) Prior Publication Data
US 2018/0145517 A1    May 24, 2018

Related U.S. Application Data

(60) Provisional application No. 62/424,312, filed on Nov. 18, 2016.

(51) Int. Cl.
*H02J 7/00* (2006.01)
*H02J 7/04* (2006.01)

(52) U.S. Cl.
CPC .............. *H02J 7/008* (2013.01); *H02J 7/045* (2013.01); *H02J 7/00* (2013.01); *H02J 2207/40* (2020.01)

(58) Field of Classification Search
CPC ........ H02J 7/008; H02J 7/045; H02J 7/00711; H02J 7/00714; H02J 2207/40

USPC .......................... 320/107, 134, 157, 159, 164
See application file for complete search history.

(56) References Cited

U.S. PATENT DOCUMENTS

| | | | | |
|---|---|---|---|---|
| 5,710,506 | A | * | 1/1998 | Broell .................. H02J 7/00711 320/145 |
| 2011/0267009 | A1 | * | 11/2011 | Nakatsuji .............. H01M 10/44 320/152 |
| 2013/0244475 | A1 | | 9/2013 | Sayadi et al. |
| 2018/0013295 | A1 | * | 1/2018 | Sporck .................... H02J 7/007 |

* cited by examiner

*Primary Examiner* — Edward Tso
*Assistant Examiner* — Aaron Piggush
(74) *Attorney, Agent, or Firm* — Brake Hughes Bellermann LLP

(57) ABSTRACT

In a general aspect, a charging apparatus can include a power converter circuit configured to supply, from an input voltage, charging power for charging a battery of an electronic device; and a control circuit configured to determine a charging current limit and a charging voltage of the power converter circuit for charging the battery. Determining the charging current limit and the charging voltage can include: setting the current limit of the power converter circuit to an initial charging current limit and setting the charging voltage to an initial charging voltage; determining whether the power converter circuit is operating in a current limit mode or a voltage limit mode; and iteratively modifying the current limit of the power converter circuit until the power converter circuit dithers between the current limit mode and the voltage limit mode.

20 Claims, 5 Drawing Sheets

US 10,790,689 B2

INTELLIGENT CONTACT CHARGING DEVICES AND METHODS

CROSS-REFERENCE TO RELATED APPLICATION

This application claims priority to and the benefit of U.S. Provisional Application No. 62/424,312 filed Nov. 18, 2016, entitled "INTELLIGENT CONTACT CHARGING SCHEME", which is hereby incorporated by reference in its entirety.

TECHNICAL FIELD

This description relates to charging systems. More specifically, this description relates to contact charging systems for electronic devices, such as mobile electronic devices.

SUMMARY

In a general aspect, a contact charging device (e.g., charging puck, etc.) can include a communication circuit configured to: detect a power adapter that is coupled with the contact charging device; and perform a negotiation process with the power adapter, the negotiation process determining an input voltage provided to the contact charging device by the power adapter. The contact charging device can also include a power converter circuit configured to supply, from the input voltage, charging power for charging a battery of an electronic device; and a control circuit configured to determine a charging current limit and a charging voltage of the power converter circuit for charging the battery. Determining the charging current limit and the charging voltage can include: setting the current limit of the power converter circuit to an initial charging current limit and setting the charging voltage to an initial charging voltage; determining whether the power converter circuit is operating in a current limit mode or a voltage limit mode; and iteratively modifying the current limit of the power converter circuit until the power converter circuit dithers between the current limit mode and the voltage limit mode.

BRIEF DESCRIPTION OF THE DRAWINGS

In the drawings, which are not necessarily drawn to scale, like numerals may reference similar components in different views. The drawings illustrate generally, by way of example, but not by way of limitation, various embodiments discussed in the present document.

DETAILED DESCRIPTION

A typical charging system for a mobile device can include an alternating-current-to-direct-current (AC-DC) wall adapter (which can also be referred to as a travel adapter, power adapter, wall adapter, etc.) that provides power (e.g., charging power) to a charging port of a mobile device (e.g., a smartphone or other mobile electronic device) through a charging cable.

In some approaches, power from the AC-DC wall adapter can include (be delivered as) low-voltage, high-current charging power, and the mobile device can include a bypass/direct charging circuit that is configured to directly charge a battery of the mobile device using the low-voltage, high-current power from the AC-DC wall adapter. However, in such approaches, due to the high-current, a substantial amount of power can be dissipated in the charging cable and/or by the charging port.

In other approaches, power from the AC-DC wall adapter can include (be delivered as) high-voltage, low-current charging power, and the mobile device can include a DC-DC step-down charging circuit that is configured to convert the supplied power (e.g., high-voltage, low-current) into lower voltage, higher current power that is used to charge a battery of the mobile device. However, in such approaches a substantial amount of power can be dissipated in the DC-DC step-down charging circuit in the mobile device, which can cause thermal stress in the mobile device (or other electronic device).

In the implementations described herein, a contact charger (charging puck, puck, etc.) can provide charging power to a mobile device with reduced power dissipation losses associated with, for example, a charging port, a charging cable, and/or a DC-DC step-down charging circuit, as well as reduce thermal stresses experienced by a mobile device (or other electronic device) during battery charging.

Figure 1:
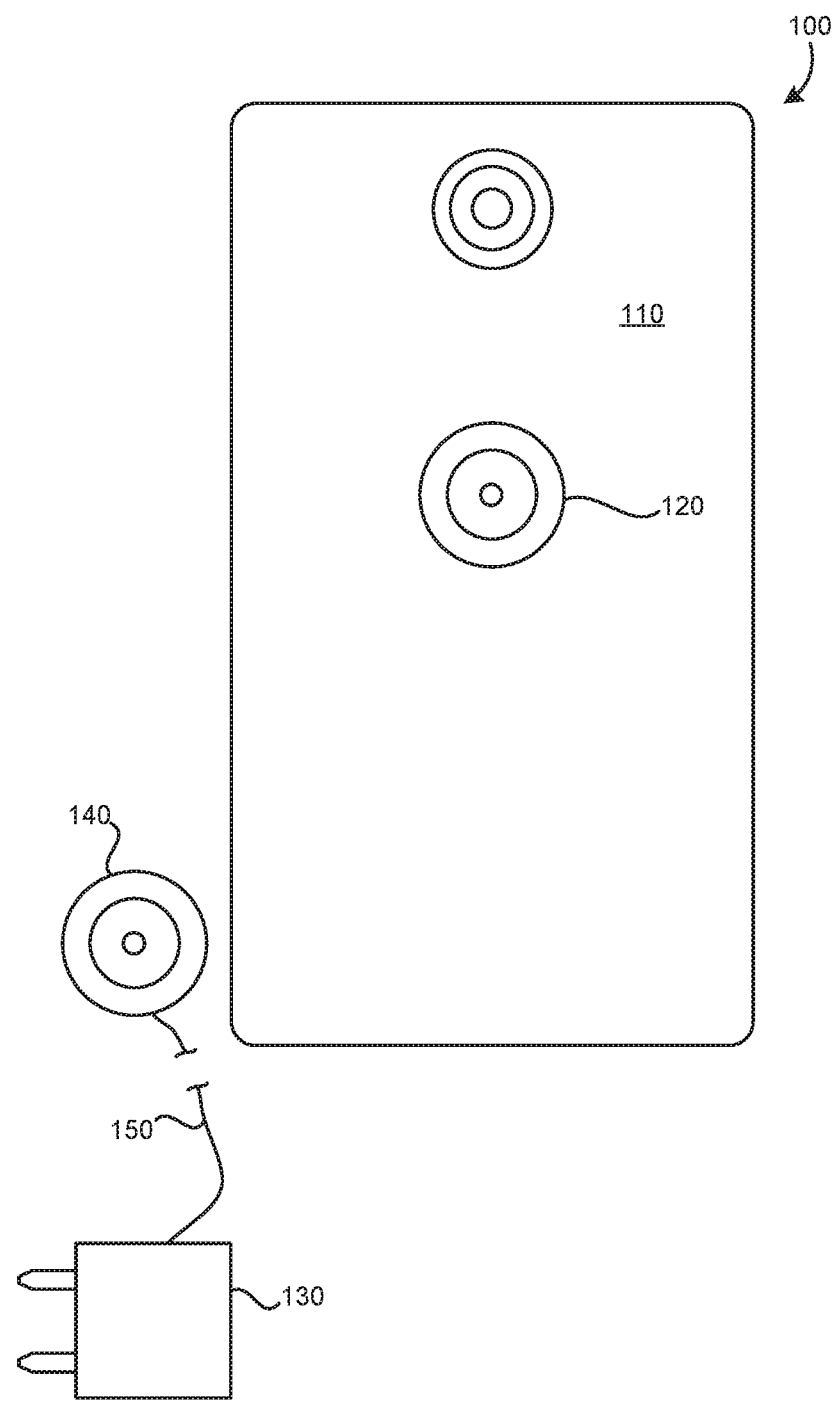
FIG. 1 is a diagram illustrating a contact charging system including a mobile device, an AC-DC wall adapter, and a contact charger that is configured to mate to a surface contact connector on the mobile device.

FIG. 1 is a diagram illustrating a contact charging system 100 including a mobile device 110, an AC-DC wall adapter (travel adapter, adapter, etc.) 130, and a contact charger (charging puck, puck, etc.) 140 that is configured to operatively mate to a surface contact connector 120 on the mobile device 110 for charging a battery (battery pack, etc.) of the mobile device (or other electronic device) 110. The AC-DC wall adapter 130 can be configured to convert AC power (e.g., residential AC power, 120/240 volt (V) AC power, etc.) to a lower, DC voltage, typically between 5V and 20V. The contact charger 140 can be coupled (operatively coupled) with the AC-DC wall adapter 130 using a cable 150, which, as indicated in FIG. 1, can vary in length. The mobile device 110 can include a battery or pack, such as a rechargeable lithium ion battery or battery pack that is configured to receive charging power from the contact charger 140 through the surface contact connector 120.

As used herein, charger can refer to a charging device (e.g., the contact charger or charging puck 140) having one or more charging circuits and/or charging electronics that are configured (e.g., collectively configured) to provide charging power to a rechargeable electronic device, such as to recharge the battery or battery pack of the mobile device 110, with reduced power dissipation losses and/or thermal stresses as prior approaches.

In implementations, the contact charger 140 can include electrical circuits, such as one or more control circuits, that are configured to implement a current-limited output (e.g., within a range of charging current values), and a communication circuit configured to provide communication between the contact charger and the AC-DC wall adapter 130. In certain implementations, such as those described herein, the electrical circuits of the contact charger 140 can include a charging circuit that includes (implements) a DC-DC step-down converter, which allows for the mobile device 110 to be implemented without a DC-DC step-down converter. Such approaches can reduce cost, reduce space used in the mobile device 110, and, as previously noted, can also reduce thermal stresses within the mobile device 100 due to heat generated by DC-DC power conversion during battery charging.

Such implementations can also provide more freedom and flexibility in mobile device design, such as allowing for the addition of additional functional features to the mobile device 110 without increasing its size (e.g., by using space that was previously used by power conversion circuitry). In certain implementations, the electrical circuits of the contact charger 140 can intelligently and autonomously monitor and configure the contact charger 140 to provide charging power according to output voltage limits and/or output current limits that are based on power output of the contact charger, and/or based one or more operating characteristic of the AC-DC wall adapter 130 and/or the mobile device 140. For example, the contact charger can be configured to iteratively search for charging current and charging voltage limits for the mobile device 110 using the approaches described herein (e.g., in accordance with the state diagram 400 shown in FIG. 4) without communicating with the mobile device 110. The current limit and/or voltage limit determinations made by the contact charger 140 can be based on, e.g., input power received by the contact charger 140 from AC-DC wall adapter and/or output power provided by the contact charger 140 to the mobile device 110.

In the example implementation of FIG. 1, the contact charger 140 can include a 2-port interface, including two electrical contacts that are configured (arranged, etc.) to electrically and/or operationally couple to respective contacts of the surface contact connector 120 of the mobile device 110. The contacts of the contact charger 140 and the surface contact connector 120 can include, respectively, a voltage bus (VBUS) and an electrical ground contact. The electrical architecture of the contact charger 140 (shown in further detail in FIGS. 2 and 3) can include a DC-DC step down converter circuit that can provide a high current (e.g., 6 A, 10 A, or more) at a low DC voltage (e.g., 3-4.5V, etc.), which can operate in voltage limit and/or current limit modes (e.g., within a range of charging voltages and/or charging currents). In some implementations, communication in the contact charging system 100 can be implemented using one or more electrical circuits included in the contact charger 140 that are configured to intelligently monitor an output (e.g., charging voltage and/or charging current) of the contact charger 140 and adaptively determine a current limit (e.g., by iteratively searching in accordance with the state diagram illustrated in FIG. 4) without communication between the contact charger 140 and the mobile device 110. Such implementations can be more efficient and less expensive to implement than existing mobile device charging systems due, at least in part, to the fact that data communication channels between the contact charger 140 and the mobile device 110 can be omitted.

In the contact charging system of FIG. 1, power (e.g., charging power) from the AC-DC wall adapter 130 to the contact charger 140 can be transferred at a high voltage (e.g., 12-20V) when possible based, e.g., on operational limitations of the AC-DC wall adapter 130. Accordingly, such high voltage charging power can be delivered at a lower current, e.g., in comparison to transferring power at a lower voltage, such as 4-5V, which would require a higher current to transfer a same amount of power and would, therefore, dissipate more of the power being delivered through the cable 150 from the AC-DC wall adapter 130 to the contact charger 140. Communication between the contact charger 140 and the AC-DC wall adapter 130, e.g., to change a voltage at which the AC-DC wall adapter 140 delivers power to the contact charger 140, can be performed using one or more industry standard protocols, such as universal serial bus power delivery (USB PD) protocol, where at least some of such power delivery protocols can be used without a microcontroller being implemented in the AC-DC wall adapter 130, providing further cost savings.

In the contact charging system 100, power conversion from high-voltage/low-current power delivered from the AC-DC wall adapter 130 to low-voltage/high-current power for charging the battery or battery pack of the mobile device 110 can be performed by the contact charger 140 (e.g., outside the mobile device 110), which, as previously noted, can reduce thermal stress within the mobile device 110 during battery charging, and also reduce circuit board area and volumetric space consumed by such power conversion electronics (e.g., in mobile devices including power conversion circuitry, such as DC-DC step down conversion circuitry). The contact charger 140 can further autonomously set (e.g., iteratively search for) output current and voltage limits (e.g., within respective charging current and charging voltage ranges) for charging a battery of the mobile device 110; can limit the amount of time a bypass charger circuit in the mobile device 110 spends in a (e.g., current and/or voltage) regulation mode, and/or can limit power dissipation in the mobile device 110 during charging of a battery of the mobile device 110.

As compared to current approaches, charging of a battery of the mobile device 110 using the contact charging system 100 (and the approaches described herein) can be accomplished without data communication (e.g., related to battery charging) between the mobile device 110 and the contact charger 140, or data communication between the mobile device 110 and the AC-DC wall adapter 130. In prior approaches, such information can include voltage and current limit information from the mobile device, which could depend on a state of the battery of the mobile device. In the contact charging system 100, because charging voltage and charging current are controlled (e.g., using the approaches described herein) by the contact charger 140, communication of charging information from the mobile device 110 to other elements of the charging system can be omitted (eliminated, etc.). The charging systems, associated devices, and corresponding methods described herein can provide for implementing a contact charging system that can charge a mobile device battery in a much quicker time than previous approaches, while reducing power dissipation losses and thermal stresses, such as discussed above.

Figure 2:
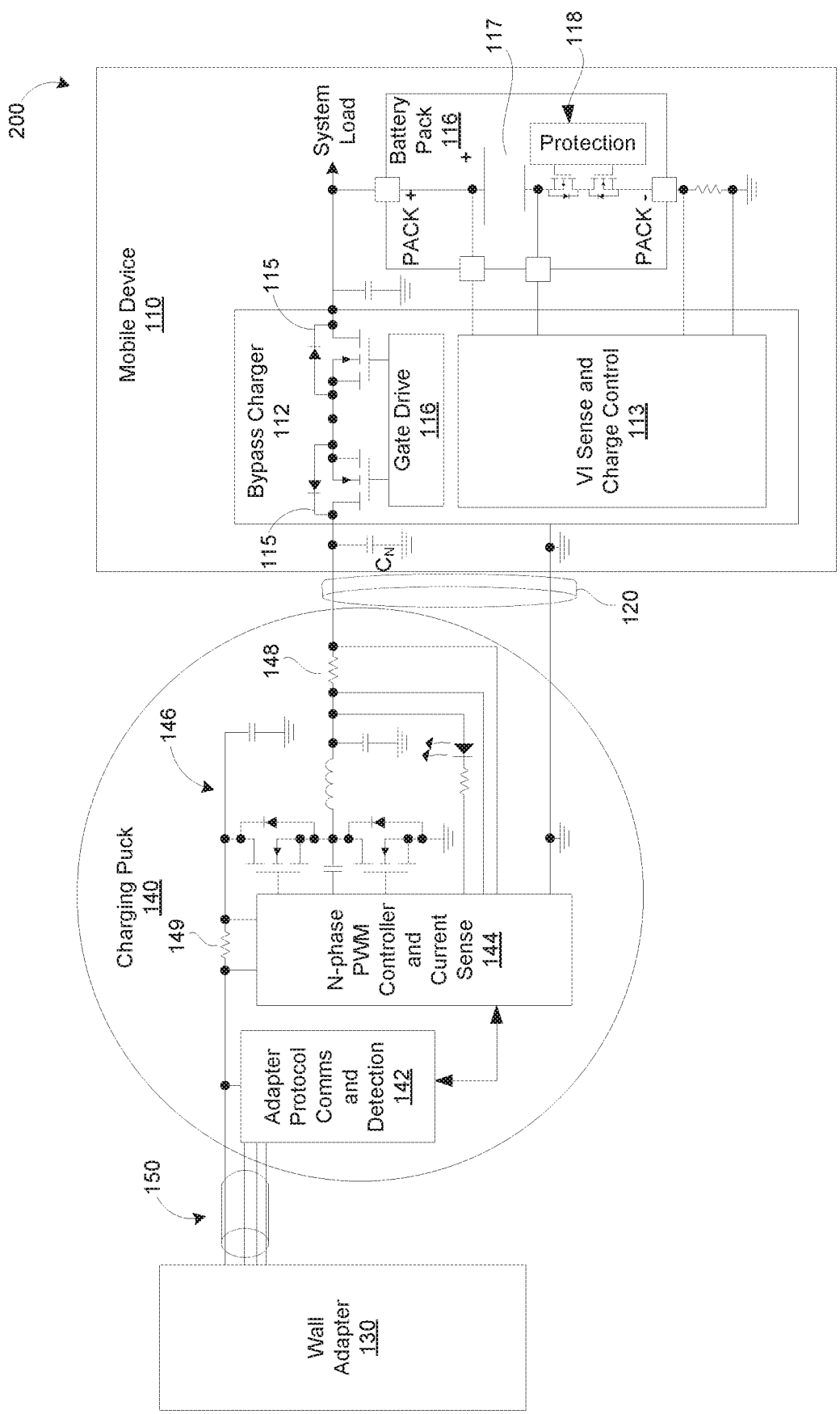
FIG. 2 is a block/schematic diagram illustrating an electrical architecture of a contact charging system, such as the contact charging system of FIG. 1.

FIG. 2 is a block/schematic diagram illustrating electrical architecture of a contact charging system 200, which can be used to implement the contact charging system 100 of FIG. 1. As shown in FIG. 2, the contact charging system 200 includes the mobile device 110, the wall adapter 130, the charging puck (contact charger) 140 and the charging cable 150. As shown in FIG. 2, that mobile device 110 can include a bypass charger circuit 112 and a battery pack 116.

As shown in FIG. 2, the bypass charger circuit 112 can include a voltage and current (VI) and charge control circuit 113, a gate drive circuit 114 and transistor/diode pairs 115. The bypass charger 112 can be configured to regulate charging voltage and/or charging current for the battery pack 116 of the mobile device 110. For example, the bypass charger 112 can be configured to prevent charging conditions (voltage and/or current) that could damage the mobile device 110, or cause overheating that could lead to hazardous conditions, such as fire.

As shown in FIG. 2, the battery pack 116 of the mobile device can include one more battery cells 117 (e.g., Li-ion battery cells) and a protection circuit 118. The protection circuit 118 can be configured to prevent undesired operating conditions, e.g., within the battery pack 118, such as internal overvoltage and/or internal overcurrent conditions.

In the contact charging system 200 shown in FIG. 2, the charging puck 140 can include one or more control circuits and/or electrical circuits, as was noted above. In the example implementation of FIG. 2, the charging puck includes an Adapter Protocol Communication and Detection control circuit 142 (control circuit 142), an N-phase pulse-width-modulation (PWM) controller and current sense control circuit 144 (control circuit 144), and a power delivery circuit (power converter circuit, etc.) 146, where N is a number of phases of the PWM controller.

The control circuit 142 can communicate (e.g., using an appropriate power delivery protocol) with the wall adapter 130, such as to set a voltage and/or current level of power provided to the charging puck 140 by the wall adapter 130. This communication between the charging puck 140 and the wall adapter 130 can be conducted over the charging cable 150, using one or more data communication signal lines included in the charging cable 150, such those described herein. The specific power delivery protocol used and/or the structure of the charging cable 150 can depend on the specific implementation, such as the power delivery capabilities of the wall adapter 130, power delivery protocols appropriate for the wall adapter 130 and/or the charging cable 150, and so forth.

The power delivery circuit 146 can, in conjunction with the control circuit 144, implement a DC-DC step down converter, to convert power received by the charging puck 140 from the wall adapter 130 via the charging cable 150. As shown in FIG. 2, the charging puck 140 is coupled with the surface contact connector 120 of the mobile device 110 (e.g., implementing a 2-port charging interface) to provide charging power from the charging puck 140 to the mobile device 110. In other implementations, the power delivery circuit 146 can be implemented using a DC-DC step up converter, a linear regulator, etc.

As shown in FIG. 2, the charging puck 140 can further include an output sense resistor 148 and an input sense resistor 149. The output sense resistor 148 and the input sense resistor 149 can be used, in conjunction with the control circuit 144, to determine, respectively, input power and output power of the charging puck 140. The charging puck 140, based on the determined input power and output power, can make determinations regarding current and/or voltage limits for power provided to the mobile device 110 and/or power received from the wall adapter 130.

Figure 3:
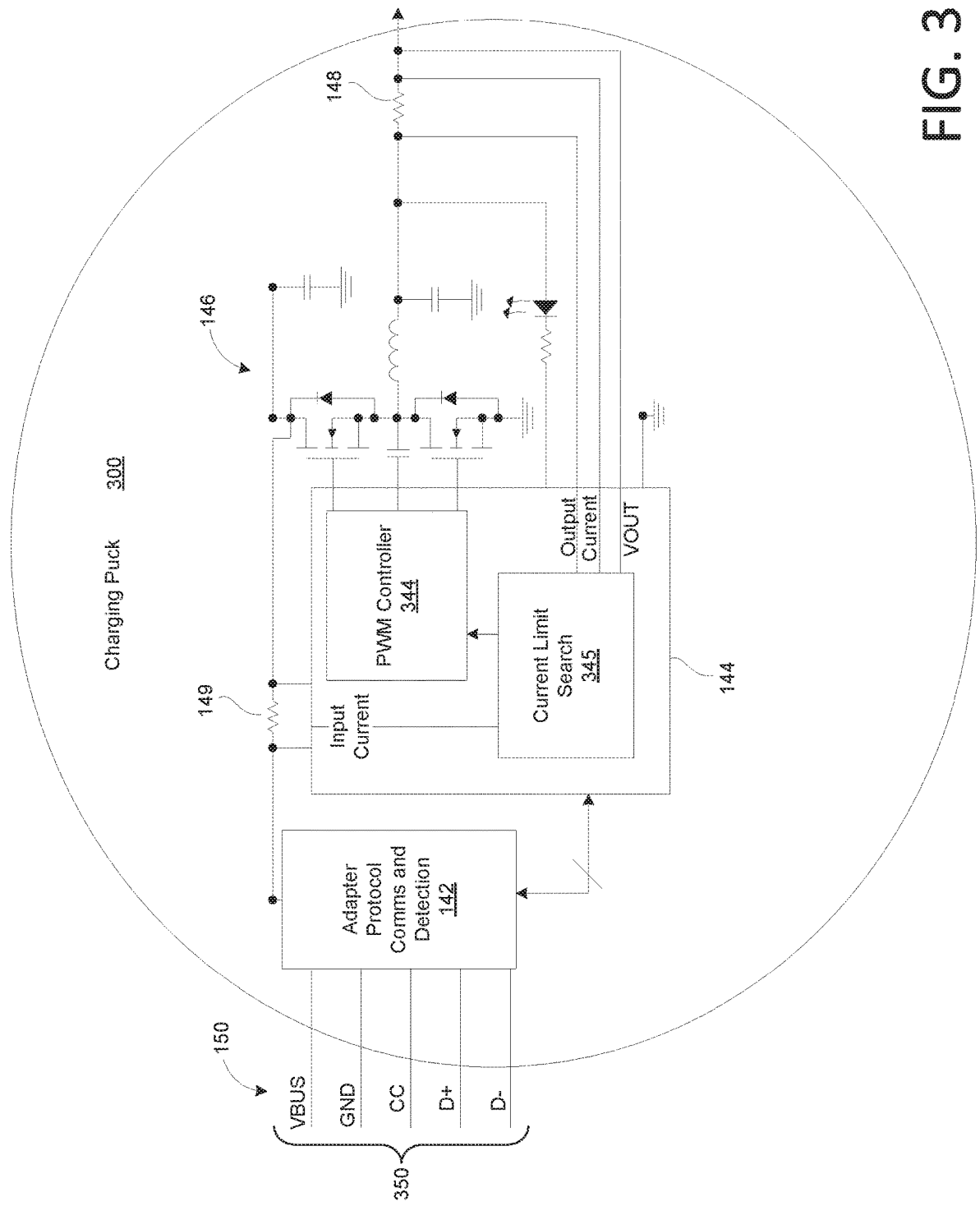
FIG. 3 is a block/schematic diagram illustrating a contact charger that can be implemented in the charging system of FIG. 1 and/or as the contact charger of FIG. 2.

FIG. 3 is a block/schematic diagram illustrating a charging puck (contact charger) 300 that can be implemented as the charging puck (contact charger) 140 in the charging system of FIG. 1 and/or as the charging puck 140 in the contact charging system 200 of FIG. 2. The charging puck 300 includes like elements as the charging puck 140 shown in FIG. 2, which are referenced using the same reference numbers as in FIG. 2.

As shown in FIG. 3, the charging puck 300 is illustrated with an example implementation of the control circuit 144 and an example implementation of the charging cable 150.

As shown in FIG. 3, in the charging puck 300, the control circuit 144 includes a PWM controller 344 and a current limit search module 345. The PWM controller 344 is coupled with the power delivery circuit 146 and the current limit search module 345. The current limit search module 345 can include one or more analog-to-digital converters (ADCs) that are coupled with the sense resistors 148 and 149. The PWM controller 344 can operate in conjunction with the power delivery circuit 146 to implement a DC-DC step down converter based on current and/or voltage limit information provided by the current limit search module. Further, the current limit search module 145 can also include hardware, firmware and/or software for determining charging current and/or charging voltage limits for the charging puck 300 (e.g., for charging power provided to the mobile device 110 via the surface contact connector 120).

As also shown in FIG. 3, the charging cable 150 can include a number of voltage and/or signal lines 350 for receiving power from, and for communication with a wall adapter, such as the wall adapter 130. As shown in FIG. 3, the voltage and/or signal lines 350 can include a voltage bus (VBUS), ground, a configuration channel (CC), and data buses (D+ and D−), such as can be used in conjunction with the USB PD protocol. In other implementations, the charging cable 150 can include other voltage and/or signal lines as appropriate for a particular wall adaptor and/or power delivery protocol.

Figure 4:
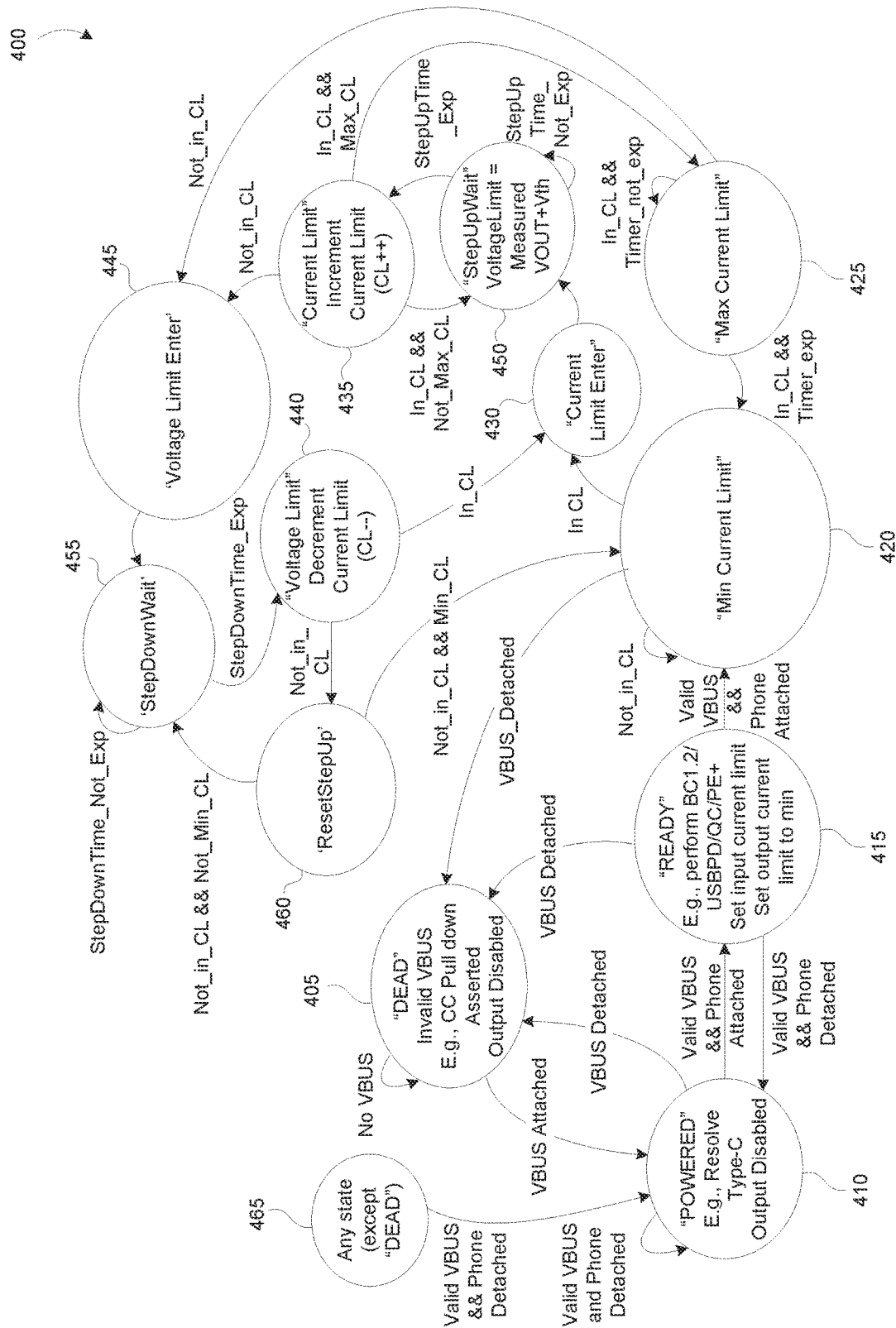
FIG. 4 is a state diagram illustrating operation of a control circuit of a contact charger, such as those shown in FIGS. 1, 2 and 3.

FIG. 4 is a state diagram 400 illustrating operation of a control circuit of a contact charger, such as can be implemented in the contact chargers shown in FIGS. 1, 2 and 3, for example. In accordance with the state diagram 400, when implemented in the contact charging systems described herein, one or more control circuits of a charging puck (contact charger) can be configured to operate the charging puck in accordance with the state diagram 400. A charging puck including such control circuits (e.g., implementing the state diagram 400) can autonomously and iteratively search for charging current and/or charging voltage limits (e.g., within respect current and voltage ranges) for charging a battery of a mobile device without receiving data regarding charging information from the mobile device. For purposes of illustration, the state diagram 400 of FIG. 4 will be described as being implemented in the contact chargers 140 (of FIG. 2) and 300 (of FIG. 3), which are collectively referred to as contact charger or charging puck in the following discussion. References to specific elements of FIGS. 2 and 3 are also made in the following description of FIG. 4.

In implementing the state diagram 400, the charging puck can include (use, implement, etc.) a number of functions, functional elements, variables and/or thresholds to facilitate autonomously and iteratively searching for charging current and/or charging voltage limits (e.g., within respective current and voltage ranges) for charging the battery pack 116 of the mobile device 110, such as by moving between the various states of the state diagram 400 in accordance with corresponding (respective) transition conditions, such as those that are discussed below.

In certain implementations, a number of functions, functional elements, variables and thresholds, where these functions, functional elements, variables and thresholds can be named to include a description of their function and/or relationship to the state diagram 400. The particular functions, functional elements, variables and thresholds used can depend on the specific implementation. Briefly, functions, functional elements, variables and thresholds that can be used, in certain implementations, to implement the state diagram 400 in the charging puck can include:
- (a) a timer that is used to control (determine, monitor, etc.) an amount of time the charging puck operates in a maximum current limit state, such as described below;
- (b) a current limit step size, where the current limit step size defines an amount that a value of a current limit (e.g., of the DC-DC step down converter of the charging puck) is changed (modified, etc.) at each iteration when the charging puck is autonomously and iteratively search for a charging current limit and/or a charging voltage limit for charging the battery pack 116 of the mobile device 110;
- (c) VBUS attach and detach thresholds;
- (d) a time step value used to establish an amount of time that should pass before changing (iterating) a current limit value (e.g., increases and decreases when iteratively searching), which are referenced as, respectively, StepUpTime and StepDownTime in FIG. 4;
- (e) a MeasuredVOUT variable, which is used to store (hold, represent, etc.) a value of an output charging voltage of the charging, e.g., such as an output voltage that is continuously measured by the ADC of the control circuit 345;
- (f) a voltage threshold Vth that is added to the measured voltage (MeasuredVOUT) to determine a maximum voltage regulation threshold, where Vth can depend on the particular implementation; and
- (g) a trialcount variable that is used to represent (e.g., index, count, etc.) a number of iterations made to increase and/or decrease a current limit, e.g., when autonomously and iteratively searching for a charging current limit for charging the battery pack 116 of the mobile device 110.

These functions, functional elements, variables and thresholds are given by way example and for purposes of illustration. In some implementations, one or more of these items can be omitted or replaced. Further, in certain implementations, additional functions, functional elements, variables and/or thresholds can be used to implement a state diagram to control operation of a charging puck.

In this example, the control circuit 345 of the charging puck 300 can be configured to control (govern, direct, etc.) operation of the charging puck in accordance with the state diagram 400. In the example implementation of FIG. 4, each oval in the state diagram 400 represents a specific state or multiple states (e.g., a mode of operation) of the charging puck. When implemented by the circuit 345 in the charging puck 300 (or the charging puck 140), determining whether to transition from a present state (mode of operation) to another state (mode of operation) in the charging puck can be determined based on corresponding transition conditions between those states, which, for the state diagram 400, are noted along with the transition arrows between each of the various states. When determining whether to transition from one state of the state diagram 400 to another state of the state diagram 400 is based on multiple transition conditions, those multiple transition conditions are listed with "&&" between the individual transition conditions, to indicate that each of those conditions should be met before transitioning from one state to another state. Some transitions in the state diagram 400 are unconditional and, therefore, no transition conditions are shown.

In the example implementation of FIG. 4, the state diagram 400 is illustrated in the form of (e.g., represents) a Finite-State Machine (FSM). When implementing the FSM of the state diagram 400, the control circuit 345 can be configured to implement a plurality of finite states, such as those shown in FIG. 4. For instance, the states of the state diagram 400 can include a DEAD state 405, a POWERED state 410, a READY state 415, a Min Current Limit state 420, a Max Current Limit state 425, a Current Limit Enter state 430, a Current Limit state 435, a Voltage Limit state 440, a Voltage Limit Enter state 445, a StepUpWait state 450, a StepDownWait state 455 and a ResetStepUp 460.

The state diagram 400 also includes an Any State (except "DEAD") state 465, which has transition conditions of Valid VBUS (e.g., VBUS above a VBUS attach threshold) && Phone Detached for transitioning to the POWERED state 410. Accordingly, if the charging puck is any state except the DEAD state 405, with the mobile device 110 attached to the charging puck, a valid VBUS voltage is provided from the wall adapter 130 and the mobile device 110 is then detached (removed from the charging puck), according to the state diagram 400, the charging puck will transition to the POWERED state 410.

In certain implementations, during charging off a mobile device by a contact charging device that operates in accordance with, for example, the state diagram 400, the contact charging device could operate using a subset of the states shown in FIG. 4. For instance, during the charging of a battery of a mobile device (or other device), a contact charging device (e.g., the contact charging device 140 or the contact charging device 300), as one example, could operate using the Min Current Limit state 420, the Max Current Limit state 425, the Current Limit state 435, and the Voltage Limit state 440 (e.g., including any corresponding transitional states, such as the Current Limit Enter state 430).

In the state diagram 400, the DEAD state 405, the POWERED state 410, the READY state 415, the Min Current Limit state 420, and the Max Current Limit state 425 can referred to as being operational mode states, functional mode states, etc. Such so-called operational mode states, for this example, can be operational states of the charging puck, or of an associated contact charging system, where transfer of charging power (even if that power is zero) is provided at (is attempted to be provided at) a steady-state, e.g., at a constant charging voltage and a constant charging current that is based on present (most recently determined) charging current and/or charging voltage limits, such as determined by the autonomous and iterative searching according to the state diagram 400. The remaining states in the state diagram 400 (other than the operational mode states noted above) can be referred to as transitional states. These transitional states can be states that are implemented (utilized, etc.) to modify one or more operating parameters (e.g., a present current limit value) before moving from one operational state to another operational state, or for modifying a charging parameter (e.g., iteratively modifying a charging current limit) and then returning to a same functional state in which the charging puck was operating prior to the charging parameter being modified.

In the state diagram 400, transition conditions that include a transition condition of In_CL (In Current Limit mode) refer to situations in which the charging puck is operating to provide charging power to the mobile device 110, where an output current of the DC-DC step down converter of the charging puck, e.g., as sensed across the output sense resistor 148, has reached a current limit. Such a current limit can, e.g., either a present current limit, as determined based on implementation of the state diagram 400, that is programmed into the DC-DC converter, or an intrinsic (design) current limit of the DC-DC converter, e.g., as determined by the operating capabilities of the DC-DC converter of the charging puck and/or a maximum operating power received by the charging puck from the wall adapter 130.

Output current of the charging puck that is sensed across the output sense resistor 148 can be provided to the ADC of the control circuit 345, where the ADC can convert the sensed current to a digital signal (e.g., a digital value). This digital signal (value) can then be utilized by the control circuit 345 (in accordance with the state diagram 400) to determine if the DC-DC converter of the charging puck is operating in current limit$_{[Pci]}$ mode (e.g., at a programmed or intrinsic current limit for the DC-DC converter).

Conversely, in the state diagram, transition conditions that include a transition condition of Not_in_CL (Not In Current Limit mode) refer to situations in which the charging puck is operating to provide charging power to the mobile device 110, where an output current of the DC-DC converter sensed across the output sense resistor 148 (e.g., by the ADC of the control circuit 345) has not reached a current limit, such as the current limits discussed above with respect to the In_CL transition condition.

In the following discussion, each state of the state diagram 400 (including relationships with other states of the state diagram 400) is described separately. The discussion for each state of the state diagram 400 also includes a discussion of associated transition conditions (e.g., for moving from one state to another state).

In the state diagram 400, the DEAD state 405 is a state (e.g., an operational state) of the charging puck where the charging puck is not connected to the wall adapter 130, or is not receiving a VBUS voltage above a VBUS attach threshold. Accordingly, in the DEAD state 405, the charging puck either has no voltage or power at its VBUS input, or has a voltage that is below the VBUS attach threshold. In the DEAD state 405, the charging puck keeps its charging power output in a disabled state (e.g., at zero voltage and zero current). In the DEAD state 405, it is irrelevant (e.g., based on the state diagram 400) if the mobile device 110 is connected to the charging puck, as the Phone Attached transition condition is not a transition condition that is associated with moving from the DEAD state 405 to another state of the state diagram 400.

The POWERED state 410 of the state diagram 400 is a specific state (e.g., an operational state) where the charging puck has a connection to the wall adapter 130, which is determined by the VBUS input of the charging puck having a voltage applied that is detectable as being above the VBUS attach threshold. The POWERED state 410 is also a state of the charging puck where the mobile device 110 is not attached to the charging puck's charging power output. As shown in FIG. 4, transition from the DEAD state 405 to the POWERED state 410 occurs if a valid input (VBUS Attached) voltage is detected from the wall adapter 130 by the charging puck (e.g., at the input sense resistor 149). Also, as was discussed above, when implementing the state diagram 400 in a charging puck, a transition to the POWERED state 410 can also occur from the Any State (except "DEAD") state 465, if the mobile device is disconnected (Phone Detached) from the charging puck but the power from the AC-DC adapter (VBUS Attached) is still valid (above the VBUS attach threshold). Also in the POWERED state 410, the control circuit 142 can resolve a direction of a USB port (e.g., if applicable for a USB Type-C port), and determine that a valid connection is made between the wall adapter 130 and the charging puck (e.g., that the VBUS Attached transition condition is met).

As shown in FIG. 4, the charging puck can transition to the READY state 415 from the POWERED state 410 if the charging puck detects that the mobile device 110 has been attached (e.g., the Phone Attached transition condition is met) with the VBUS Attached condition continuing to be met. The determination that the mobile device 100 has been attached to the charging puck can be made using a number of appropriate techniques. For instance, the charging puck can include a detection pin on its connector that is isolated from a (e.g., ground) reference pin of the connector, where the detection pin only achieves a same potential as the reference pin when the surface contact connector 120 of the mobile device 110 is attached to the charging puck. As shown in the state diagram 400, in this example, the READY state 415 can only be reached from the POWERED state 410.

In the READY state 410, the charging puck can complete, over the interface 350, a negotiation process with the wall adapter 130 using an appropriate power delivery protocol for the particular implementation. As part of this negotiation process, the charging puck may instruct the wall adapter 130 to raise its output voltage and/or its output current. Examples of possible power delivery protocols are the USB Power Delivery (PD) protocol and the USB Battery Charging Spec 1.2 (BC1.2) protocol.

Further in the state diagram 400, the charging puck, as part of the negotiation in the READY state 415, can configure its input current limit based on a result of its negotiation with the wall adapter 130. As in the READY state 415, the charging puck can configure a charging power output current limit (an initial current limit) to a lower current limit of a current limit range of the charging puck. That is, the charging puck can configure its DC-DC converter to have an initial current limit that is a lowest (minimum) value of a range of current values for the charging puck, or at a minimum current limit for the charging puck.

In the state diagram 400, the Min Current Limit state 420 is a state (e.g., an operational state) where the DC-DC converter of the charging puck supplies charging power from its output terminals to the mobile device 110 using the minimum current limit of the charging puck. In the Min Current Limit state 420, the charging puck can also configure a charging power output voltage of the charging puck to a maximum output voltage that the DC-DC converter circuit of the charging puck is capable of (designed for) supplying. Accordingly, the Min Current Limit state 420 could also be referred to as operating in an upper voltage limit state. In FIG. 4, the variable MAX_VL represents this maximum voltage of the output of the DC-DC converter and can be programmed into, or dynamically changed based on the particular implementation. The charging puck will continue to operate in the Min Current Limit state 420 while the charging power output of the charging puck (e.g., based on the voltage across and the current through the output sense resistor 148) is determined to operate as voltage limited and not current limited (e.g., while the charging conditions of the mobile device are such that the charging voltage does not drop and the charging current does not increase to, or above, the minimum current limit). In implementations using the functions, functional elements, variables and thresholds noted above, at Min Current Limit state 420, trialcount can be set to 0, stepuptime can be set to 0.1 s, stepdowntime can be set to 0.1 s and VoltageLimit can be set to a MAX_VL for a particular implementation.

The Max Current Limit state 425 of the state diagram 400 is a state (e.g., operational state) of the charging puck where the DC-DC converter is supplying power, at its output, for charging the mobile device 110, where the charging current is at (or above) a Maximum Current Limit (Max_CL) threshold. For instance, the maximum current limit value can be the lower of an upper (maximum) current limit value for the DC-DC converter (e.g., an upper value of a range of current limit values) as a result of the maximum output power available from the wall adapter 130 (which can be determined based on a current sensed through the input sense resistor 149 and an associated input voltage), or the charging puck's DC-DC converter's intrinsic maximum output current capability (which can be fixed by design). Accordingly, the intrinsic maximum output current capability need not be fixed, and can vary based on the type of wall adapter 130 coupled with the charging puck, as well as a result of the negotiation between the charging puck and the wall adapter 130 during the READY state 415. As shown in FIG. 4, a charging puck implementing the state diagram 400 will operate in the Max Current Limit state 425 as long as the charging power output of the charging puck operates at or above the Max_CL threshold and the timer (e.g., which can be implemented in the control circuit 345) that is used to control (determine, monitor, etc.) an amount of time the charging puck operates in the Max Current Limit state 425 does not expire.

The foregoing discussion describes the states (state 405, 410, 415, 420 and 425) of the state diagram 400 that are indicated above as being operational modes (or operational states) As was noted above, the remaining states of the state diagram 400 (with the exception of the state 465) are transitionary states that, in a charging puck implementing the state diagram 400, continuously, and in real-time, make updates to the current limit of the DC-DC converter to autonomously and iteratively search for an appropriate charging current limit for the mobile device 110, e.g., to charge the battery pack 116 of the mobile device 110 more quickly and efficiently than using a fixed charging current limit, or voltage limited charging.

In the StepUpWait state 450, a VoltageLimit threshold or variable is modified in real-time. This threshold can be an output voltage that the charging puck's DC-DC converter circuit will attempt to regulate the output charging power to. The output voltage of the charging puck can be sensed by the control circuit 345 at the output of the charging puck (e.g., across the output sense resistor 148, which can then be provided to an ADC and used determine if the charging puck is operating in current limit).

In the StepUpWait state 450, the output voltage limit that will be regulated by the DC-DC converter when it is not in current limit can be configured to the measured output voltage (MeasuredVOUT) plus a threshold (Vth, as discussed above). Vth can be a predetermined head-room threshold value, and can be based on the specific implementation of the contact charging system and/or the charging puck. The Vth value can be utilized by the control circuit 345 (e.g., the current limit search circuit), using the ADC of the circuit 345 to determine that the charging puck is not operating in current limit mode and, therefore, is operating in voltage limit mode.

The transitional Current Limit Enter state 430, as shown in FIG. 4, is entered either from the Min Current Limit state 420 or from another transition state, the Voltage Limit state 440, when the charging puck detects that its charging power output is operating in current limit mode (e.g., delivering charging power at or above a present current limit of the DC-DC converter of the charging puck). This can be determined by the ADC of the control circuit 345 determining that a current sensed across the output sense resistor 148 has reached the most recently determined current limit for the charging puck. At the Current Limit Enter state 430, the trialcount variable can be incremented, e.g., to indicate occurrence of an iteration of the current limit value for the contact charging device.

As shown in FIG. 4, the transitional StepUpWait state 450 can be reached from the transitional Current Limit Enter state 430 unconditionally (without any transition conditions). At the StepUpWait state 450, the control circuit 345 can cause the charging puck to 'wait' a period of time that is determined by the stepuptime variable. A voltage limit for detecting that the charging puck is operating in a voltage limit mode and, therefore, not operating in a current limit mode, can also be configured in the StepUpWait state 450.

In implementations, when the stepuptime expires, according to the state diagram 400, the charging can transition from the StepUpWait state 450 to the Current Limit state 435, where a present current limit value of the DC-DC converter of the charging puck can be iterated (incremented) by the current limit step size. While FIG. 4 shows the current limit value being incremented by a single step size increment, the step size can be determined, or varied, based on the specific implementation.

From the Current Limit state 435, there can be three possible transitions. Two of these transitions can occur if the charging power output of the charging puck remains in current limit. If the output remains in current limit but has not reached a value that is equal to, or greater than the Max_CL threshold, then the charging puck can transition back to the StepUpWait state 450 and the current limit iteration process can continue. If the charging power output of the charging puck remains in current limit and the current limit has reached the Max_CL threshold, operation of the charging puck can transition to the Max Current Limit state 425, which was described above.

From the Current Limit state 435, if the charging power output of the charging puck is no longer operating in current limit, which can occur, for example, if the bypass charger 112 in the mobile device 110 reaches a regulation threshold and, as a result, goes into regulation mode, (such as a current regulation loop or a voltage regulation loop), then the charging puck can transition to the transitional Voltage Limit Enter state 445.

In the Voltage Limit Enter state 445, the trialcount variable can be used to determine the stepuptime timer value (e.g., increase the stepuptime timer value) for subsequent iterations of the present current limit value. This process can be performed to allow for relatively slower paced dithering between current and voltage limits once the contact charging system reaches a point where, in steady state, the current limit for the charging power for the mobile device 110 cannot be increased further.

From the Voltage Limit Enter state 445, the transitional StepDownWait state 455 can be entered (unconditionally) in order to wait a period of time (e.g., stepdowntime) before reducing (decrementing) the present current limit value, which occurs in the transitional Voltage Limit state 440 in the state diagram 400. In certain implementations (e.g., implementations implemented using the functions, functional elements, variables and thresholds noted above, in the Voltage Limit Enter state 445, if trialcount equals 10, then the stepuptime value can be set to 0.5 s (e.g., for slowing the dithering pace of the contact charging device) and trialcount can be decremented (e.g., by 1). Otherwise, the stepuptime value can remain unchanged (e.g., 0.1 s).

In the Voltage Limit state 440, if the output of the charging puck remains in voltage limit mode (therefore, not in current limit mode), the current limit of the DC-DC converter of the charging puck can continue to be reduced using the transitional ResetStepUp state 460 and the StepDownWait state 455. The intent of this process is to allow the charging power output of the charging puck to achieve operation in current limit mode as quickly as possible, since that is the goal of the system and, can improve charging efficiency for the battery pack 116 of the mobile device 110. In this example, at the ResetStepUp state 460, the contact charging device can also reset the trialcount variable to zero and reset the stepuptime (e.g., to 0.1 s), so that future increases in current limit can occur more rapidly. If, while in the ResetStepUp state 460, the current limit value of the charging puck reaches the minimum current limit value, a transition of the charging puck to operate in the Min Current Limit state 420 (described above) can be made.

In certain implementations, such as those implementing a control circuit in a contact charging device that operates in accordance with the state diagram 400, iteratively searching for (iteratively modifying, etc.) a charging current limit and a charging voltage for charging a battery of an electronic device can be implemented using operation and states, such as those discussed above. For instance, iteratively searching for a charging current limit and a charging voltage for charging a battery of an electronic device can include the control circuit establishing an initial charging voltage and an initial charging current limit. The control circuit can then determine if the contact charging device is operating in current limit or voltage limit. Based on this determination, the control circuit can iterate a charging current limit (e.g., increment or decrement) after waiting a period of time (e.g. stepuptime or stepdowntime). The control circuit can also keep track of the iterations (e.g. using the trialcount variable). When an appropriate (e.g., an efficient, fast charging) current limit for charging the battery is reached, the contact charging device can be configured to dither (switch between) operating in current limit and voltage limit using longer stepuptime and stepdowntime values to iterate, increase or decrease the charging current limit (e.g., by a single current limit step size) when switching from current limit to voltage limit (while dithering).

Figure 5:
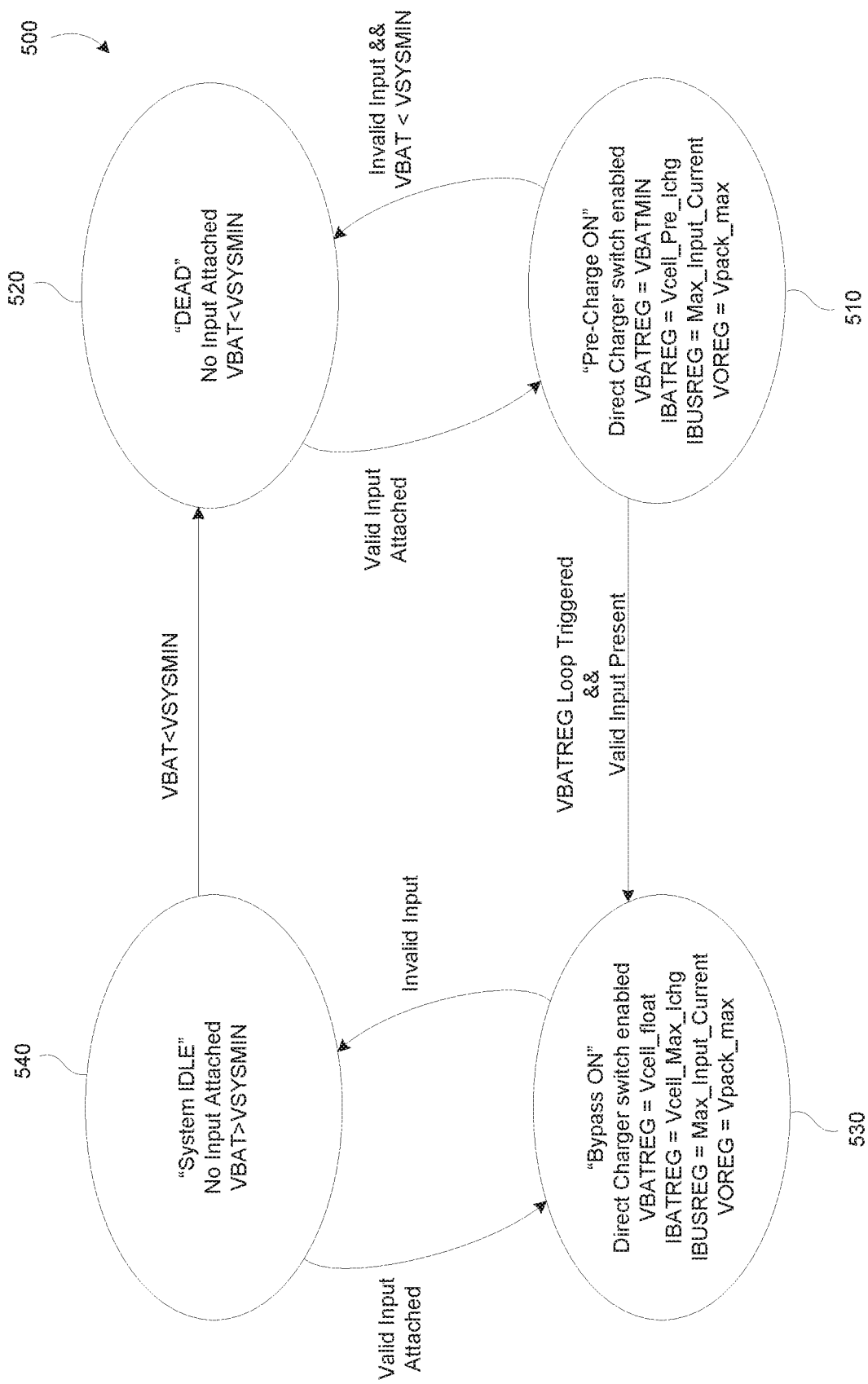
FIG. 5 is a state diagram illustrating operation of a control circuit of a mobile device, such as in conjunction with operation of a control circuit of a contact charger as illustrated in FIG. 4.

FIG. 5 is a state diagram 500 illustrating operation of a control circuit of a mobile device (e.g., the mobile device 110), such as in conjunction with operation of a control circuit of a contact charger as illustrated by the state diagram 400 of FIG. 4. The state diagram 500 is given by way of example and for purposes of illustration, and is described with further reference to the other drawings. For certain implementations, the state diagram 500 may be a simplified model of mobile device behavior, states, and operation. For instance, the state diagram 500 should be primarily viewed from the perspective of battery charging. For example, the mobile device bypass charger 112 can enable itself, such as in the Pre-Charge ON state 510. In other examples, a switching charger can be required, which is not shown in this example.

As with the state diagram 400 of FIG. 4, a number of variables can be used by the mobile device 110 when the state diagram 500 is implemented by a control circuit of the mobile device. The variables can include, for example:

(a) VSYSMIN, which can be a minimum system voltage to allow the system to be powered ON (e.g., below this, the PMIC or mobile device can decide to shut down the mobile device);

(b) VBATMIN, which can be a minimum battery voltage threshold that determines the threshold to change from a pre-charge current to a fast-charge current; and (c) Vpack_max, which can be a maximum output voltage that can be seen on a VSYS node of the mobile device.

(d) Vcell_Pre_Ichg, which can be a maximum charging current allowed by the mobile device system while in the pre-charge mode (e.g., PreCharge ON state 510).

(e) Vcell_Max_Ichg, which can be a maximum charging current allowed by the mobile device system while in a normal operating mode (e.g., that is, not pre-charge)

(f) Max_Input_Current, which can be a maximum input current that the charging circuit in the mobile device is allowed to draw from its input (e.g., from the charging puck)

(g) Vcell_float, which can be a maximum battery/cell voltage that the battery in the mobile device can be allowed to reach during charging.

In certain implementations where the mobile device 110 implements the state diagram 500, the DEAD state 520 may not be a true operational state, but can represent a state of the mobile device 100 where a voltage of the battery pack 116 is below a minimum required threshold that can allow the mobile device 110 to operate. For purposes of the discussion of FIG. 5, it will be assumed that the entire mobile phone system is dead in this state, even though a battery is attached (inserted, coupled with, etc.), and may have some level of charge. In an example, a power-management integrated circuit (PMIC) or a discrete power management system can remain powered from a very weak battery (e.g., down to 2.6V, etc.), but may not allow the entire mobile device 110 to be powered up (e.g., processor, screen, radios, etc.).

An example operation sequence of a contact charging system, in accordance with the state diagram 500 and/or the state diagram 400, can include the following. For instance, when the wall adapter 130 is connected to the power, it may not provide any output power downstream unless an attached charging puck is discovered. This is determination can be made using an appropriate power delivery protocol. When the charging puck is attached to the wall adapter 130 and it gets, e.g., 5V power initially from the wall adapter 130, the charging puck may not take any further actions at that point (e.g., may remain in the POWERED state 410). That is, the charging puck may not provide power out of its charging power connector until it discovers an attached mobile device (the mobile device 110). The charging puck can be capable of powering itself up and attempt to negotiate up to 12V-20V for its input power, if the wall adapter 130 is compatible. This can be accomplished using the USB PD protocol or any other common communication interface that is appropriate.

Once the charging puck negotiates its input voltage with the wall adapter 130, the charging can provide an initial charging voltage at an initial current limit (e.g., 5V and 500 mA) and can program itself with a default (e.g., 500 mA) current limit, by proceeding through the READY state 415 and the Min Current Limit state 420 of the state diagram 400.

The bypass charger 112 in the mobile device 110 can detect the presence of a valid input voltage (and current) and either automatically attempt to start charging, or informs a host controller in the mobile device 110 that can initiate charging. If starting charging is automatic, and the battery is dead, the bypass charger 112 may automatically set up its battery current (IBATREG) limit at some low level like 100 mA (which is referred to as Vcell_Pre_Ichg in Pre-Charge ON state 510). The bypass charger 112 may also automatically increase that level (e.g., 500 mA) when the battery voltage rises above a minimum threshold. The bypass charger 112 can be programmed with input current regulation (IBUSREG), battery current regulation (IBATREG), battery voltage regulation (VBATREG), output voltage regulation (VOREG) thresholds and a pre-charge mode (e.g., Pre-Charge ON state 510).

In the Pre-Charge ON state 510, VBATREG can be programmed to VBATMIN, so that once the battery voltage reaches a battery voltage at which fast charging (high current) can be performed, the battery voltage regulation loop can be triggered. The IBATREG threshold can be programmed with V_ell_Pre_Ichg, which represents a maximum current that the battery can be charged with in the pre-charge mode.

While in the Pre-Charge ON state 510, the VBATREG threshold can be reached, which can cause a transition to a Bypass ON state (530), where the VBATREG and IBATREG thresholds can be re-configured (e.g., either automatically by the bypass charger 112, or by a system processor/controller) to higher values suitable for high-current fast charging.

If, while in the Pre-Charge ON state 510, the input voltage becomes invalid, this can result in a transition back to the DEAD state (520), since the battery voltage would remain below the VSYSMIN threshold.

If, while in the Bypass ON state 530, the input voltage becomes invalid, then the transition is made to a System IDLE state (540), which represents a state where there is no input power source attached, but the battery voltage remains higher than the VSYSMIN threshold, that allows the system to remain operational.

If, while in the System IDLE state 540, the battery voltage discharges (e.g., as part of normal operation of the mobile device 110) below VSYSMIN, a transition can be made to the DEAD state (520). Alternatively, if while in the System IDLE state 540, the input voltage becomes valid again, a transition can be made directly to the Bypass ON state 530, as the battery voltage is already above the VBATMIN threshold for charging the battery pack 116 with a high current.

When the bypass charger 112 is enabled, it may attempt to fully close its switches, which can cause power to be sourced from the charging power output of the charging puck. In some implementations, the bypass charger 112, can then go into one of a current regulation loop (due to current through the bypass charger 112 exceeding IBATREG) or a voltage regulation loop (due to battery voltage exceeding VBATREG). In this situation, one of two things may occur. First, if a current or voltage regulation loop is triggered on the bypass charger, it will regulate its switch resistance accordingly. This will result in the current limit of the charging puck's charging power output not being reached, and detected as not being in current limit, such as discussed above with respect to FIG. 4. Since the charging puck detects that its output current limit is not reached, it may iteratively reduce its current limit by the current limit step size (e.g., 100 mA), and reset its step up time, in order to attempt to stay operating in current limit. Alternatively, the bypass switch 112 may be turned on fully (and no regulation loops are triggered). This will cause the current limit of the charging puck output to be reached. When this occurs, the charging puck's converter can iteratively step its current limit up by the current limit step size (Ex: 100 mA).

In such implementations, the operation of the charging puck will dither between stepping up and stepping down its current limit value, with the goal being for the charging puck charging power output to stay in current limit, so that the bypass charger 112's switch need not be in regulation. However, if the charging puck output current limit keeps increasing due to the bypass switch never reaching regulation, the charging puck can have a maximum current limit Max_CL (e.g., 8 A) beyond which it will not further increase its current limit up even though it may be operating in current limit. This can function as a safety limit for the charging system and can be either limited by a programmed register or default value, the input voltage of the charging puck (output of the TA) being at a minimum voltage (VTALIM), or by a maximum current limit Max_CL communicated by the wall adapter 130 to the charging puck.

In a general aspect, a contact charging device can include a communication circuit configured to detect a power adapter that is coupled with the contact charging device; and perform a negotiation process with the power adapter. The negotiation process can determine an input voltage provided to the contact charging device by the power adapter. The contact charging device can further include a power converter circuit configured to supply, from the input voltage, charging power for charging a battery of an electronic device. The contact charging device can also include a control circuit configured to determine a charging current limit and a charging voltage of the power converter circuit for charging the battery. Determining the charging current limit and the charging voltage can include: setting the current limit of the power converter circuit to an initial charging current limit and setting the charging voltage to an initial charging voltage; determining whether the power converter circuit is operating in a current limit mode or a voltage limit mode; and iteratively modifying the current limit of the power converter circuit until the power converter circuit dithers between the current limit mode and the voltage limit mode.

Implementations can include one or more of the following features. For instance, the power converter circuit can be a direct-current-to-direct-current (DC-DC) step down converter.

Determining whether the power converter circuit is operating in a current limit mode or a voltage limit mode can include at least one of: determining an output current of the power converter circuit and comparing the output current to the current limit; or determining an output voltage of the power converter circuit and comparing the output voltage to the charging voltage. The contact charging device can include an analog-to-digital converter configured to determine the output current of the power converter circuit based on the output voltage of the power converter circuit and a value of an output sense resistor.

Iteratively modifying the current limit of the power converter circuit until the power converter circuit dithers between the current limit mode and the voltage limit mode can include: while the power converter circuit is operating in the current limit mode, iteratively increasing the current limit until the power converter circuit changes from operating in the current limit mode to operating in the voltage limit mode; and while the power converter circuit is operating in the voltage limit mode, iteratively decreasing the current limit until the power converter circuit changes from operating in the voltage limit mode to operating in the current limit mode. Iteratively increasing the current limit can include iteratively increasing the current limit until the current limit equals an upper charging current limit. The control circuit can be configured to limit an amount of time the contact charging device operates at the upper charging current limit.

Iteratively modifying the current limit of the power converter circuit can include waiting a period of time between each modification of the current limit of the power converter circuit.

In another general aspect, a method for charging a battery of an electronic device can include: detecting, by a contact charging device, a power adapter that is coupled with the contact charging device; performing, by the contact charging device, a negotiation process with the power adapter, the negotiation process determining an input voltage provided to the contact charging device by the power adapter; supplying, by a power converter circuit of the contact charging device from the input voltage, charging power for charging the battery of the electronic device; and determining, by the contact charging device, a charging current limit and a charging voltage of the power converter circuit for charging the battery. Determining the charging current limit and the charging voltage can include: setting the current limit of the power converter circuit to an initial charging current limit and setting the charging voltage to an initial charging voltage; determining whether the power converter circuit is operating in a current limit mode or a voltage limit mode; and iteratively modifying the current limit of the power converter circuit until the power converter circuit dithers between the current limit mode and the voltage limit mode.

Implementations can include one or more of the following features. For instance, determining whether the power converter circuit is operating in a current limit mode or a voltage limit mode can include at least one of: determining an output current of the power converter circuit and comparing the output current to the current limit; or determining an output voltage of the power converter circuit and comparing the output voltage to the charging voltage.

Iteratively modifying the current limit of the power converter circuit until the power converter circuit dithers between the current limit mode and the voltage limit mode can include: while the power converter circuit is operating in the current limit mode, iteratively increasing the current limit until the power converter circuit changes from operating in the current limit mode to operating in the voltage limit mode; and, while the power converter circuit is operating in the voltage limit mode, iteratively decreasing the current limit until the power converter circuit changes from operating in the voltage limit mode to operating in the current limit mode. Iteratively increasing the current limit includes iteratively increasing the current limit until the current limit equals an upper charging current limit. The method can include limiting an amount of time the contact charging device operates at the upper charging current limit. The method can include, after the amount of time the contact charging device operates at the upper charging current limit has passed: resetting the current limit of the power converter circuit to the initial charging current limit; and resetting the charging voltage to the initial charging voltage.

Iteratively modifying the current limit of the power converter circuit can include waiting a period of time between each modification of the current limit of the power converter circuit.

In another general aspect, a contact charging device can include: a power converter circuit configured to supply, from an input voltage, charging power for charging a battery of an electronic device; and a control circuit configured to determine a charging current limit and a charging voltage of the power converter circuit for charging the battery. The control circuit can implement a number of states of finite state machine. The states can include: a first current limit state that includes setting the current limit of the power converter circuit to an initial charging current limit and setting the charging voltage to an initial charging voltage; a second current limit state that includes incrementing the charging current limit in response to the contact charging device operating in a current limit mode; a third current limit state that includes operating the contact charging device at an upper current limit of the contact charging device; and a voltage limit state that includes decrementing the charging current limit in response to contact charging device operating in a voltage limit mode.

The contact charging device can be configured to transition from the first current limit state to the second current limit state in response to the contact charging device operating in the current limit mode.

The contact charging device, when operating in the second current limit state, can be configured to periodically increment the current limit in response to the contact charging device continuing to operate in current limit mode. The contact charging device can be configured to transition from the second current limit state to the third current limit state in response to the contact charging device operating in the current limit mode and the current limit being equal to the upper current limit of the contact charging device.

The contact charging device can be configured to transition from the second current limit state to the voltage limit state in response to the contact charging device operating in the voltage limit mode.

Various embodiments are illustrated in the figures above. One or more features from one or more of these embodiments may be combined to form other embodiments.

Method examples described herein can be machine or computer-implemented at least in part. Some examples may include a computer-readable medium or machine-readable medium encoded with instructions operable to configure an electronic device or system to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should, therefore, be determined with references to the appended claims, along with the full scope of equivalents to which such claims are entitled.

What is claimed is:

1. A contact charging device comprising:
   a communication circuit configured to:
   detect a power adapter that is coupled with the contact charging device; and
   perform a negotiation process with the power adapter, the negotiation process determining an input voltage provided to the contact charging device by the power adapter;
   a power converter circuit configured to supply, from the input voltage, charging power for charging a battery of an electronic device; and
   a control circuit configured to determine a charging current limit and a charging voltage of the power converter circuit for charging the battery, the determining the charging current limit and the charging voltage including:

setting the charging current limit of the power converter circuit to an initial charging current limit and setting the charging voltage to an initial charging voltage;

determining whether the power converter circuit is operating in a current limit mode or a voltage limit mode; and iteratively modifying the charging current limit of the power converter circuit until the power converter circuit dithers between the current limit mode and the voltage limit mode.

2. The contact charging device of claim 1, wherein the power converter circuit is a direct-current-to-direct-current (DC-DC) step down converter.

3. The contact charging device of claim 1, wherein determining whether the power converter circuit is operating in a current limit mode or a voltage limit mode includes at least one of:

determining an output current of the power converter circuit and comparing the output current to the charging current limit; and determining an output voltage of the power converter circuit and comparing the output voltage to the charging voltage.

4. The contact charging device of claim 3, further comprising an analog-to-digital converter configured to determine the output current of the power converter circuit based on the output voltage of the power converter circuit and a value of an output sense resistor.

5. The contact charging device of claim 1, wherein iteratively modifying the charging current limit of the power converter circuit until the power converter circuit dithers between the current limit mode and the voltage limit mode includes:

while the power converter circuit is operating in the current limit mode, iteratively increasing the charging current limit until the power converter circuit changes from operating in the current limit mode to operating in the voltage limit mode; and while the power converter circuit is operating in the voltage limit mode, iteratively decreasing the charging current limit until the power converter circuit changes from operating in the voltage limit mode to operating in the current limit mode.

6. The contact charging device of claim 5, wherein iteratively increasing the charging current limit includes iteratively increasing the charging current limit until the charging current limit equals an upper charging current limit.

7. The contact charging device of claim 6, wherein the control circuit is configured to limit an amount of time the contact charging device operates at the upper charging current limit.

8. The contact charging device of claim 1, wherein iteratively modifying the charging current limit of the power converter circuit includes waiting a period of time between each modification of the charging current limit of the power converter circuit.

9. A method for charging a battery of an electronic device, the method comprising:

detecting, by a contact charging device, a power adapter that is coupled with the contact charging device;

performing, by the contact charging device, a negotiation process with the power adapter, the negotiation process determining an input voltage provided to the contact charging device by the power adapter;

supplying, by a power converter circuit of the contact charging device from the input voltage, charging power for charging the battery of the electronic device; and determining, by the contact charging device, a charging current limit and a charging voltage of the power converter circuit for charging the battery, the determining the charging current limit and the charging voltage including:

setting the charging current limit of the power converter circuit to an initial charging current limit and setting the charging voltage to an initial charging voltage;

determining whether the power converter circuit is operating in a current limit mode or a voltage limit mode; and iteratively modifying the charging current limit of the power converter circuit until the power converter circuit dithers between the current limit mode and the voltage limit mode.

10. The method of claim 9, wherein determining whether the power converter circuit is operating in a current limit mode or a voltage limit mode includes at least one of:

determining an output current of the power converter circuit and comparing the output current to the charging current limit; and determining an output voltage of the power converter circuit and comparing the output voltage to the charging voltage.

11. The method of claim 9, wherein iteratively modifying the charging current limit of the power converter circuit until the power converter circuit dithers between the current limit mode and the voltage limit mode includes:

while the power converter circuit is operating in the current limit mode, iteratively increasing the charging current limit until the power converter circuit changes from operating in the current limit mode to operating in the voltage limit mode; and while the power converter circuit is operating in the voltage limit mode, iteratively decreasing the charging current limit until the power converter circuit changes from operating in the voltage limit mode to operating in the current limit mode.

12. The method of claim 11, wherein iteratively increasing the charging current limit includes iteratively increasing the charging current limit until the charging current limit equals an upper charging current limit.

13. The method of claim 12, further comprising limiting an amount of time the contact charging device operates at the upper charging current limit.

14. The method of claim 13, further comprising, after the amount of time the contact charging device operates at the upper charging current limit has passed:

resetting the charging current limit of the power converter circuit to the initial charging current limit; and resetting the charging voltage to the initial charging voltage.

15. The method of claim 9, wherein iteratively modifying the charging current limit of the power converter circuit includes waiting a period of time between each modification of the charging current limit of the power converter circuit.

16. A contact charging device comprising:

a two-port interface configured to be operatively coupled to a surface contact connector on an electronic device;

a power converter circuit configured to supply, from an input voltage received from a cable attached to a charger, charging power for charging a battery in the electronic device via a bypass charger in the electronic device; and a control circuit configured to determine a charging current limit and a charging voltage of the power converter circuit for charging the battery, to prevent the bypass charger from remaining in a regulation mode during the charging of the battery in the electronic device, the control circuit implementing a number of states of finite state machine, the states including:
- a first current limit state that includes setting the charging current limit of the power converter circuit to an initial charging current limit and setting the charging voltage to an initial charging voltage;
- a second current limit state that includes incrementing the charging current limit in response to the contact charging device operating in a current limit mode;
- a third current limit state that includes operating the contact charging device at an upper current limit of the contact charging device; and
- a voltage limit state that includes decrementing the charging current limit in response to the contact charging device operating in a voltage limit mode.

17. The contact charging device of claim 16, wherein the contact charging device is configured to transition from the first current limit state to the second current limit state in response to the contact charging device operating in the current limit mode.

18. The contact charging device of claim 16, wherein the contact charging device, when operating in the second current limit state, is configured to periodically increment the charging current limit in response to the contact charging device continuing to operate in current limit mode.

19. The contact charging device of claim 18, wherein the contact charging device is configured to transition from the second current limit state to the third current limit state in response to the contact charging device operating in the current limit mode and the charging current limit being equal to the upper current limit of the contact charging device.

20. The contact charging device of claim 16, wherein the contact charging device is configured to transition from the second current limit state to the voltage limit state in response to the contact charging device operating in the voltage limit mode.

* * * * *